(12) United States Patent
Minh et al.

(10) Patent No.: US 11,115,503 B2
(45) Date of Patent: *Sep. 7, 2021

(54) SYSTEMS AND METHODS FOR INTERFACING NETWORKS REGARDLESS OF COMMUNICATION SCHEME

(71) Applicant: COUPANG CORP., Seoul (KR)

(72) Inventors: Hyun Sik Eugene Minh, Seoul (KR); Yonghee Lee, Gyeonggi-do (KR); Byung Woo Lee, Incheon (KR); Jin Kwang Kim, Gyeonggi-do (KR)

(73) Assignee: Coupang Corp., Seoul (KR)

( * ) Notice: Subject to any disclaimer, the term of this patent is extended or adjusted under 35 U.S.C. 154(b) by 49 days.

This patent is subject to a terminal disclaimer.

(21) Appl. No.: 16/746,710

(22) Filed: Jan. 17, 2020

(65) Prior Publication Data

US 2021/0014336 A1 Jan. 14, 2021

Related U.S. Application Data

(63) Continuation of application No. 16/510,372, filed on Jul. 12, 2019, now Pat. No. 10,574,794.

(51) Int. Cl.
  *G06F 15/16* (2006.01)
  *H04L 29/06* (2006.01)
(52) U.S. Cl.
  CPC .............. *H04L 69/08* (2013.01); *H04L 69/22* (2013.01)
(58) Field of Classification Search
  None
  See application file for complete search history.

(56) References Cited

U.S. PATENT DOCUMENTS 6,111,893 A 8/2000 Volftsun et al.
7,412,539 B2 * 8/2008 Gmuender .............. H04L 29/06
  709/203

(Continued)

FOREIGN PATENT DOCUMENTS

CN 101141419 A 3/2008
CN 103179027 A 6/2013

OTHER PUBLICATIONS

Examination Report dated Jan. 18, 2021, by the Australian Patent Office in Australian Application No. 2020264387, 6 pages.

(Continued)

*Primary Examiner* — Quang N Nguyen
(74) *Attorney, Agent, or Firm* — Finnegan, Henderson, Farabow, Garrett & Dunner, LLP

(57) ABSTRACT

A computer-implemented system for interfacing a set of one or more communication networks and a second communication network is disclosed. The system may comprise a memory strong instructions and at least one processor configured to execute the instructions. The instructions may comprise: receiving a first message from a first communication network, the first message comprising a first non-standardized message header and a first non-standardized message body; parsing the first non-standardized message header to determine a first variable corresponding to the identity of the first communication network and a second variable corresponding to a first destination; identifying a first communication protocol of the first message based on the first variable; converting the first non-standardized message body into a standardized format for the second communication network based on the first identified communication protocol; and transmitting the first standardized message body to the first destination based on the second variable.

18 Claims, 9 Drawing Sheets

(56) References Cited

U.S. PATENT DOCUMENTS

| | | | |
|---|---|---|---|
| 7,633,929 B1* | 12/2009 | Fu | H04M 7/066 |
| | | | 370/352 |
| 7,962,582 B2 | 6/2011 | Potti et al. | |
| 10,574,794 B1 | 2/2020 | Minh et al. | |
| 2004/0172618 A1* | 9/2004 | Marvin | G06F 8/36 |
| | | | 717/116 |
| 2008/0130648 A1 | 6/2008 | Ra et al. | |
| 2011/0004694 A1 | 1/2011 | Taylor | |
| 2011/0320617 A1* | 12/2011 | Annamalaisami | |
| | | | H04L 63/1458 |
| | | | 709/228 |
| 2016/0041952 A1 | 2/2016 | Malladi et al. | |
| 2016/0087871 A1 | 3/2016 | Dixon et al. | |
| 2016/0232043 A1* | 8/2016 | Malnati | G06F 11/0721 |
| 2017/0043731 A1 | 2/2017 | Kim et al. | |
| 2017/0072876 A1 | 3/2017 | Rajan et al. | |
| 2017/0099332 A1 | 4/2017 | Bullotta et al. | |
| 2019/0149449 A1* | 5/2019 | Morris | H04L 45/22 |
| | | | 709/238 |

OTHER PUBLICATIONS

International Search Report and Written Opinion dated Sep. 23, 2020, by the Korean Patent Office in PCT Application No. PCT/IB2020/056168, 13 pages.

Office Action dated Oct. 13, 2020, by the Korean Patent Office in Korean Patent Application No. 10-2019-0094980, 16 pages.

Office Action dated Jul. 12, 2021, by the Taiwanese Patent Office in Taiwanese Application No. 110103808, 11 pages.

Examination Notice dated Jul. 13, 2021, by the Hong Kong Patent Office in Hong Kong Application No. 22020010248.5, 10 pages.

Examination Report dated Jul. 12, 2021, by the Australian Patent Office in Australian Application No. 2020264387, 4 pages.

\* cited by examiner

FIG. 1B

SYSTEMS AND METHODS FOR INTERFACING NETWORKS REGARDLESS OF COMMUNICATION SCHEME

RELATED APPLICATIONS

This application is a continuation of U.S. patent application Ser. No. 16/510,372 filed on Jul. 12, 2019, the contents of which are hereby incorporated by reference in the present application in their entirety.

TECHNICAL FIELD

The present disclosure generally relates to computerized systems and methods for interfacing one or more external communication networks with an internal communication network. In particular, embodiments of the present disclosure relate to inventive and unconventional systems that enable a communication network to interface with other communication networks (e.g., operated by a third-party) regardless of respective communication protocols or application programming interfaces (API) of the other communication networks.

BACKGROUND

Advancement of internet and computer networks has made computer networks ubiquitous in the current world. Almost every home or office is equipped with a private network. In addition, business entities such as a large corporation, manufacturing plant, or warehouses operate a variety of systems within their internal network. For the purposes of this disclosure, a network may be defined as a computer network enabling communication between different systems using a common message format, where each of the systems within the same network can transmit and receive messages without converting or translating them. These internal networks connect and enable communication among the different systems that are owned and operated by the same entity. New internal systems or external (i.e., a group of systems connected by an independent network with a different communication format) systems can be added or connected to the internal network, but such process requires a manual configuration of different network parameters.

Interfacing two different systems typically involves using a specific API such as one of a Representational State Transfer (REST) based API, file transfer API, database-to-database transfer API, or the like. Different APIs, however, may have different syntax and formatting requirements, which must be met in order for the two systems to be able to communicate with each other. Furthermore, different systems may also utilize different communication protocols, and messages from a transmitting system must be converted before a receiving system can interpret the messages.

A problem arises when an entity with a variety of systems that manage different aspects of its operation must be able to communicate with another entity. In this case, the two entities must agree on a common API and a communication protocol (collectively referred to hereinafter as communication scheme) and modify all of their systems to adopt the agreed communication scheme. An alternative is to put in place a converting mechanism between each pair of systems, one from each entity, that must communicate with each other. Both methods, however, are costly, both in terms of the cost of implementation and the cost of operation. The problem becomes even more complex when one of the entities must also communicate with yet another entity that uses a different communication scheme because the third entity must also either adopt the same scheme or implement a converting mechanism for each system.

As such, there is a need for centralized solution that interfaces a group of systems of one entity (i.e., internal systems) with groups of systems of multiple different entities (i.e., different external systems) regardless of their respective communication scheme.

SUMMARY

One aspect of the present disclosure is directed to a computer-implemented system for interfacing a set of one or more communication networks and a second communication network. The system may comprise a memory strong instructions and at least one processor configured to execute the instructions. The instructions may comprise: receiving a first message from a first communication network among the set of communication networks, the first message comprising a first non-standardized message header and a first non-standardized message body; parsing the first non-standardized message header to determine a first variable corresponding to the identity of the first communication network and a second variable corresponding to a first destination; identifying, using a preconfigured data structure, a first communication protocol of the first message based on the first variable; converting the first non-standardized message body into a standardized format for the second communication network based on the first identified communication protocol; and transmitting the first standardized message body to the first destination based on the second variable.

Yet another aspect of the present disclosure is directed to a computer-implemented method for interfacing a set of one or more communication networks and a second communication network. The method may comprise: receiving a first message from a first communication network among the set of communication networks, the first message comprising a first non-standardized message header and a first non-standardized message body; parsing the first non-standardized message header to determine a first variable corresponding to the identity of the first communication network and a second variable corresponding to a first destination; identifying, using a preconfigured data structure, a first communication protocol of the first message based on the first variable; converting the first non-standardized message body into a standardized format for the second communication network based on the first identified communication protocol; and transmitting the first standardized message body to the first destination based on the second variable.

Furthermore, another aspect of the present disclosure is directed to a computer-implemented system for interfacing a set of one or more communication networks and a second communication network. The system may comprise an inbound endpoint layer configured to receive an inbound message from a first communication network among the set of communication networks, the inbound message comprising a non-standardized inbound message header and a non-standardized inbound message body. The inbound endpoint layer may further comprise an inbound parser configured to parse the non-standardized inbound message header to determine a first portion corresponding to an identity of the first communication network and a second portion corresponding to a first destination located within the second communication network. The system may further comprise: an inbound converting layer configured to convert the non-standardized inbound message body into a standardized format based on the first portion and a preconfigured data structure of known communication networks; a routing layer configured to transmit the standardized inbound message body to the first destination; an outbound endpoint layer configured to receive an outbound message from the second communication network, the outbound message comprising a standardized outbound message body and a second destination located within a third communication network among the set of communication networks; and an outbound converting layer configured to convert the standardized outbound message body into a non-standardized format based on the second destination and the preconfigured data structure of known communication networks. The routing layer may further be configured to transmit the non-standardized outbound message body to the second destination.

Other systems, methods, and computer-readable media are also discussed herein.

BRIEF DESCRIPTION OF THE DRAWINGS

Figure 1B:
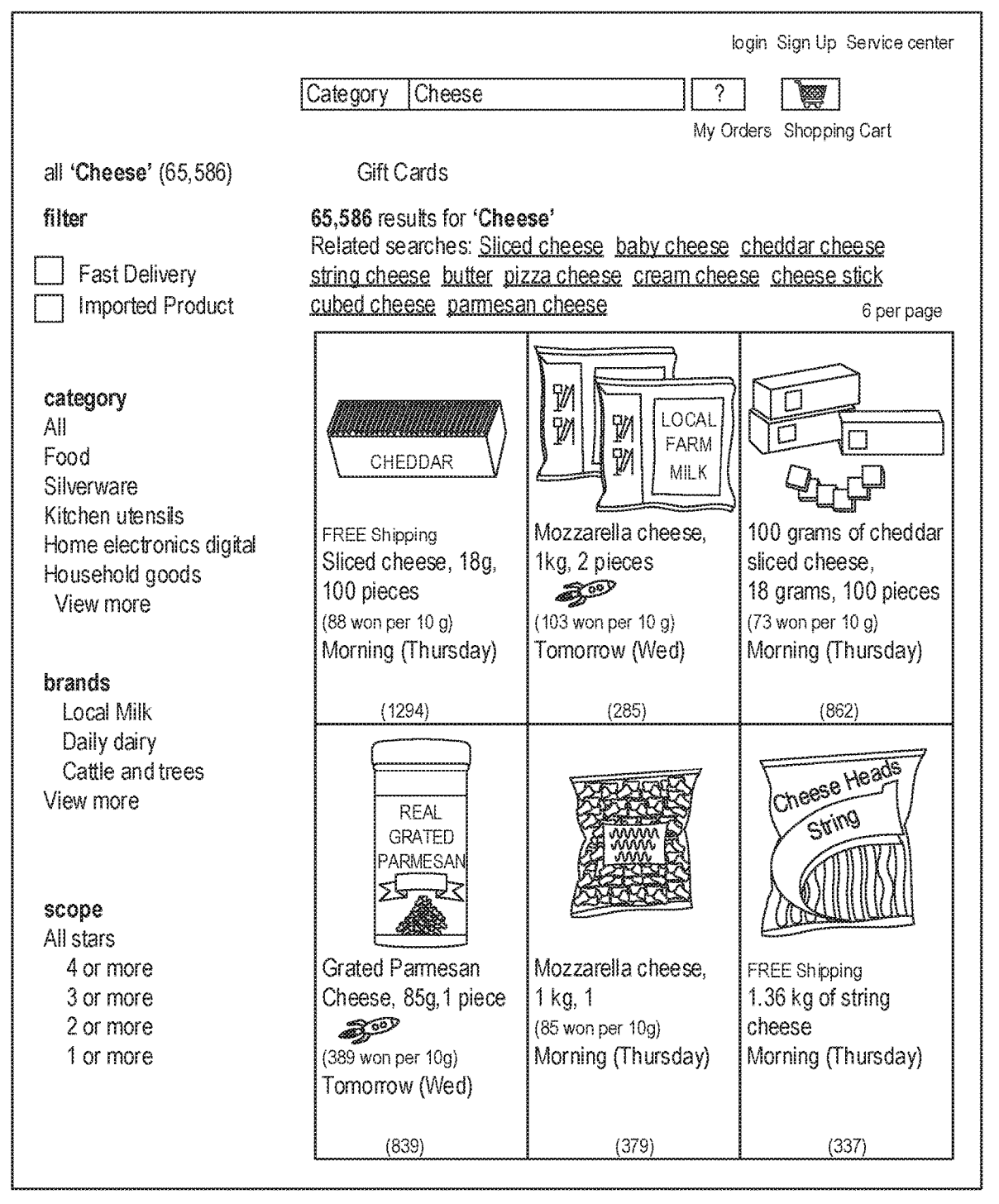

FIG. 1B depicts a sample Search Result Page (SRP) that includes one or more search results satisfying a search request along with interactive user interface elements, consistent with the disclosed embodiments.

DETAILED DESCRIPTION

Figure 1A:
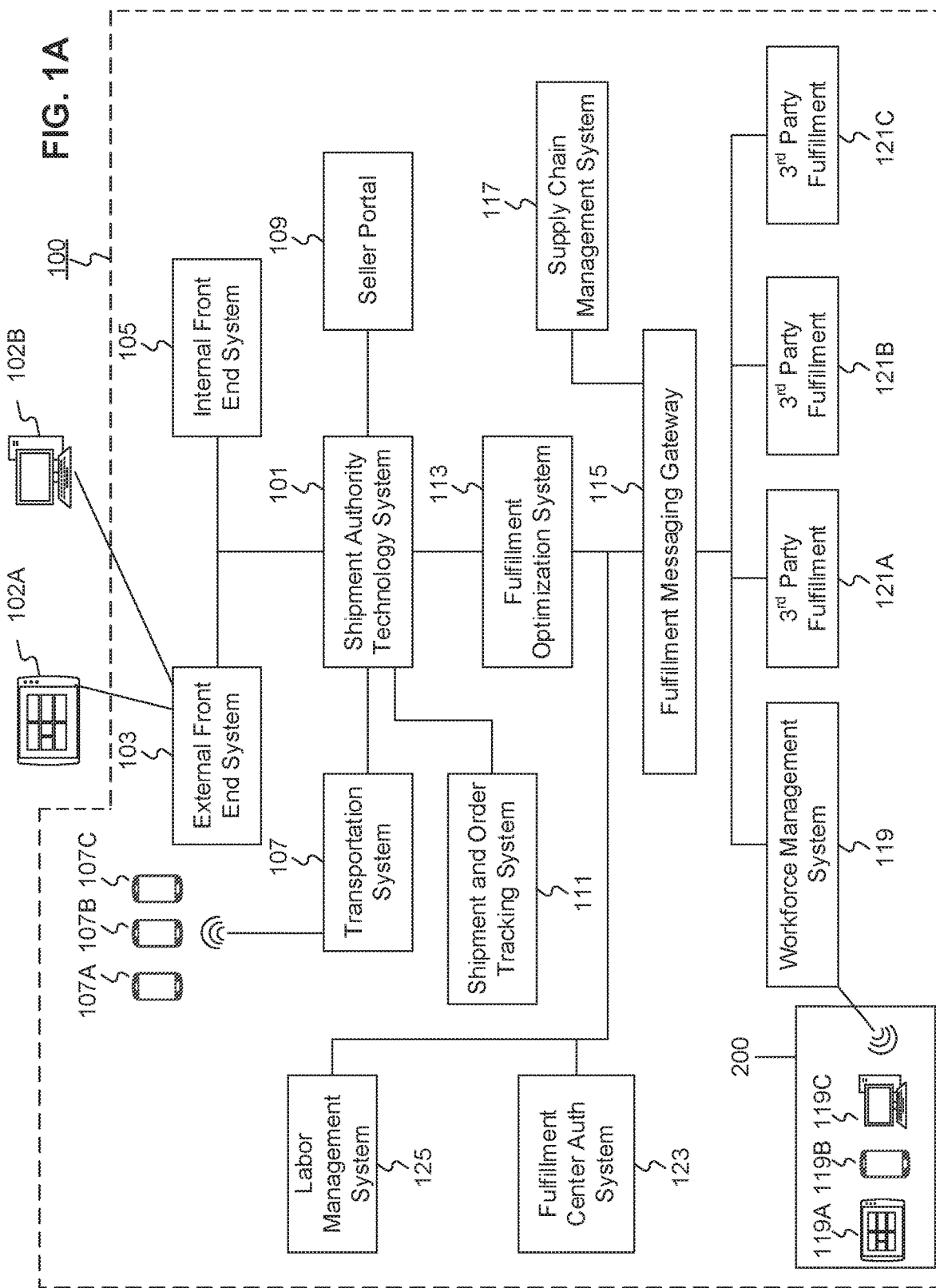
FIG. 1A is a schematic block diagram illustrating an exemplary embodiment of a network comprising computerized systems for communications enabling shipping, transportation, and logistics operations, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for interfacing internal systems with different groups of external systems regardless of their communication scheme.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
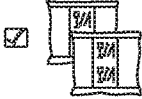
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
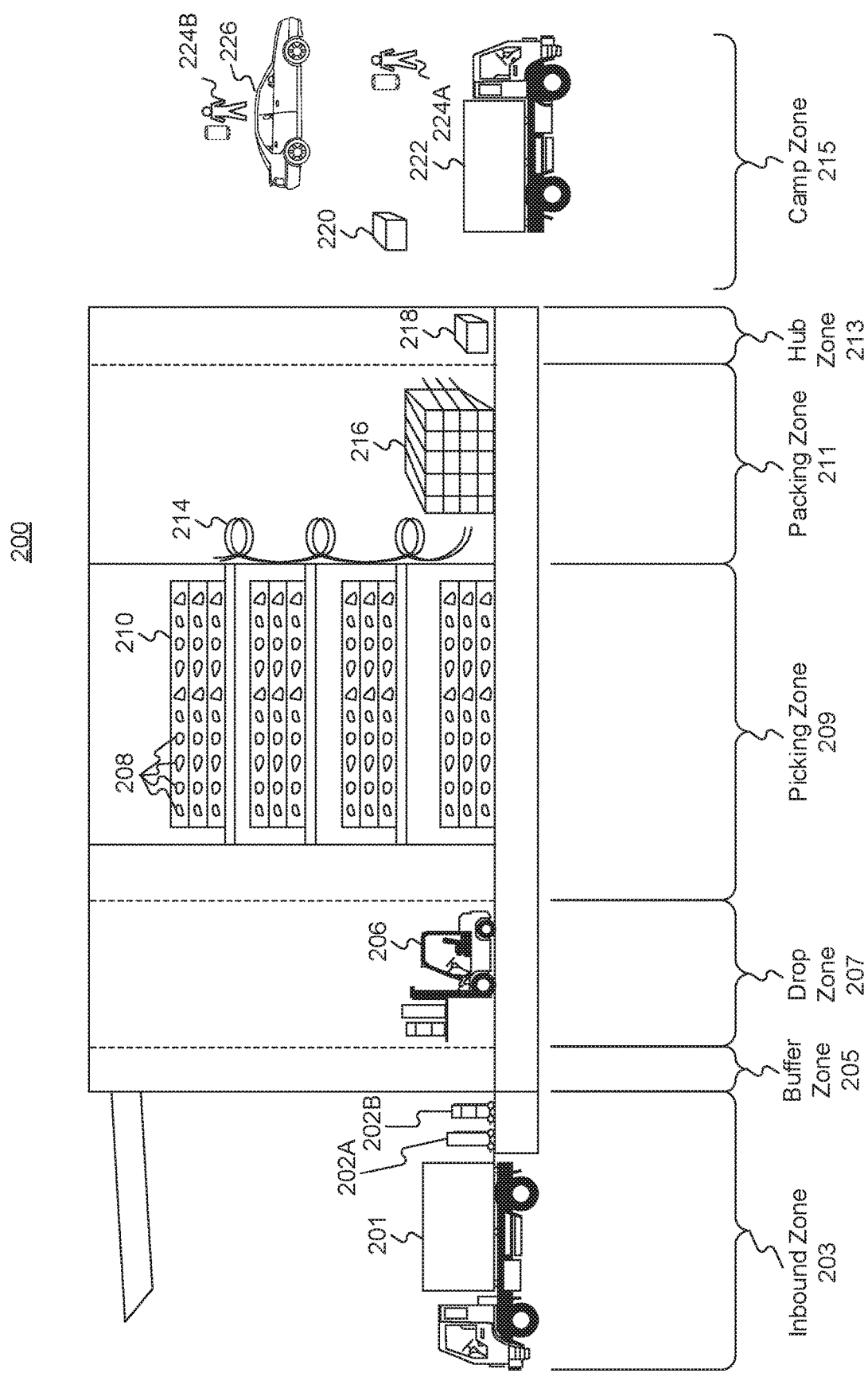
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
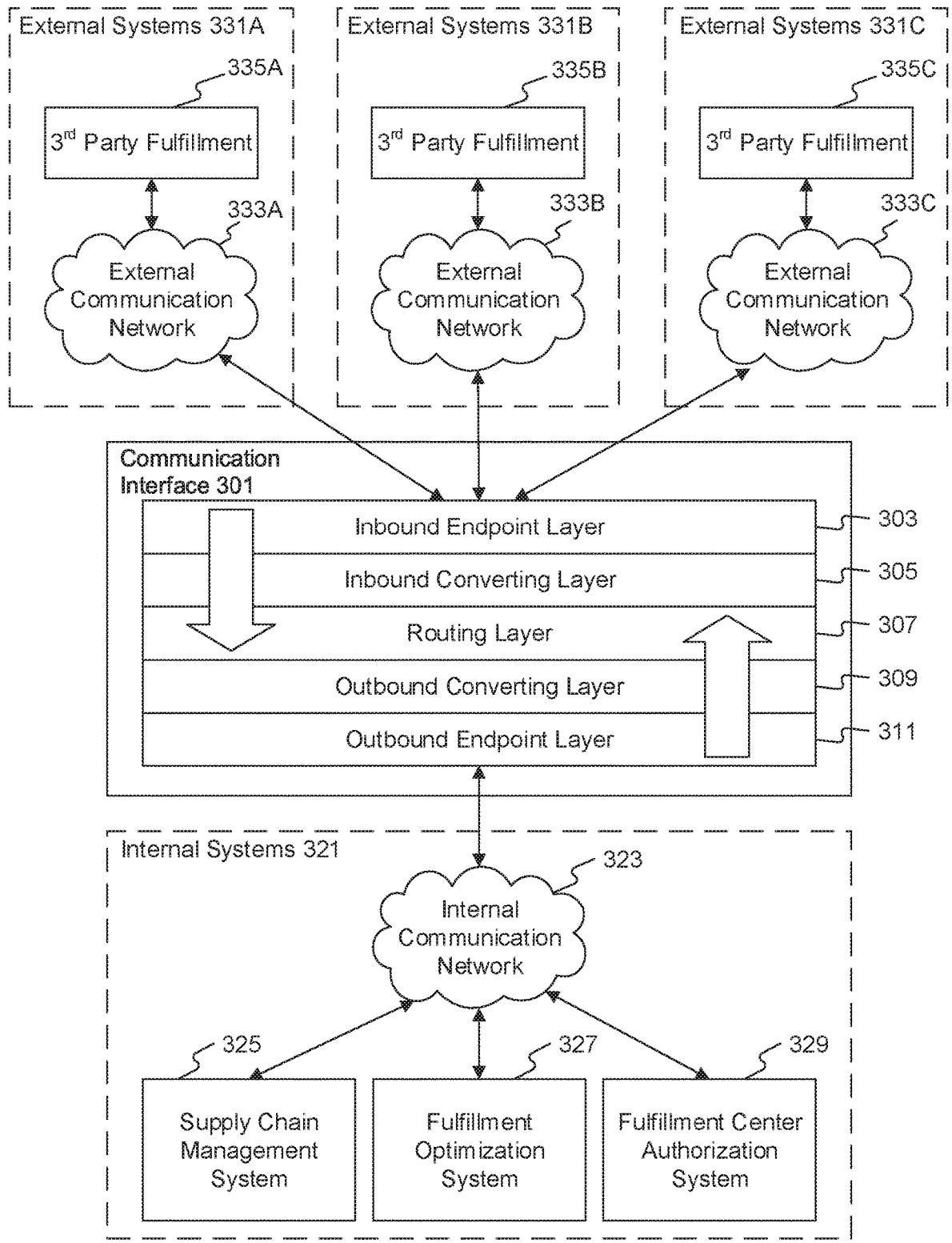
FIG. 3 is a schematic block diagram illustrating an exemplary embodiment of a computerized system for interfacing between internal systems and external systems, consistent with the disclosed embodiments.

FIG. 3 depicts a schematic block diagram illustrating an exemplary embodiment of an interface diagram 300 where communication interface 301 serves as the interface between internal communication network 323 and one or more external communication networks 333A-C. In some embodiments, internal systems 321 may comprise one or more of the systems shown in FIG. 1A, such as supply chain management system (SCM) 325, fulfillment optimization system (FO) 327, or fulfillment center authorization system (FC Auth) 329. Alternatively or additionally, internal systems 321 may comprise other systems not disclosed above with respect to FIG. 1A. In some embodiments, individual systems in internal systems 321 may communicate with each other or among themselves via internal communication network 323. Also in some embodiments, internal communication network 323 and external communication networks 333A-C may include one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

Although three external systems 331A-C are shown, communication interface 301 enable communication with any number of external systems as would be obvious to one of ordinary skill in the art. Each of external systems 331A-C may comprise a different group of systems such as $3^{rd}$ party fulfillment 335A-C. External systems 331A-C may each comprise additional systems similar to those described above with respect to FIG. 1A or other systems as appropriate for their respective needs.

In some embodiments, communication interface 301 may enable internal systems 321 to communicate with multiple external systems 331A-C. Each group of systems within respective external systems 331A-C may communicate with each other or among themselves via their own individual internal networks (referred to hereinafter as external communication networks 333A-C). Additionally or alternatively, multiple communication interfaces may be implemented between internal communication network 323 and one or more external communication networks 333A-C, each dedicated to different functions such as managing orders, managing inventory, managing workforce, or the like. In some embodiments, each of internal systems 321 and external systems 331A-C may operate as independent, non-overlapping networks, where individual systems within one communication network is not a part of another communication network.

In some embodiments, internal communication network 323 and external communication networks 333A-C may be implemented using one or more APIs known in the art. An API, in some embodiments, may comprise a set of functions and procedures allowing one system to access the features or data of another system. Internal communication network 323 and external communication networks 333A-C may be implemented using APIs such as a Representational State Transfer (REST) API, RESTful API, file transfer API, database-to-database API, Simple Object Access Protocol (SOAP) API, Remote Procedure Call (RPC) API, or the like.

In some embodiments, internal communication network 323 and external communication networks 333A-C may transmit and receive signals using one or more communication protocols. Communication protocols may be a set of rules and syntax for serializing data. In some embodiments, communication protocols may include at least one of JavaScript Object Notation (JSON), YAML Ain't Markup Language (YAML), Extensible Markup Language (XML), Tom's Obvious Minimal Language (TOML), CoffeeScript Object Notation (CSON), MessagePack, or the like.

As such, internal communication network 323 and external communication networks 333A-C may be implemented using countless combinations of API and communication protocol as described above. Communication interface 301, in some embodiments, may be implemented as a computer system that receives a message from one end and transmits a translated message through the other end. For example, communication interface 301 may receive an inbound message from a particular external system (e.g., external system 331A) via its corresponding external communication network 333A that utilizes a particular communication scheme (e.g., XML protocol using REST API). Communication interface 301 may then convert the message into the communication scheme utilized by the internal communication network 323 (e.g., JSON protocol using SOAP API). The particular combination of communication schemes disclosed are exemplary only and other combinations may be used as desired. In addition, different communication networks may utilize identical or partially identical combinations.

In some embodiments, communication interface 301 may also receive and convert messages from another external system (e.g., external system 331B) that utilizes a different communication scheme (e.g., YAML protocol using RPC API) into the same communication scheme utilized by the internal communication network 323 (i.e., JSON protocol using SOAP API). In other words, communication interface 301 may standardize non-standardized messages from different external communication networks 333A-C into the standard communication scheme utilized by the internal communication network 323. In some embodiments, communication interface 301 may also receive outbound messages from an internal system in the standard communication scheme and transmit them to a specified external communication network (e.g., external communication network 333C) after converting them into the non-standardized format utilized by the specified external communication network.

In some embodiments, communication interface 301 may comprise inbound endpoint layer 303, inbound converting layer 305, routing layer 307, outbound converting layer 309, and outbound endpoint layer 311. In some embodiments, each layer may be implemented as a dedicated system, software function, programmable subunit, or the like.

Figure 4:
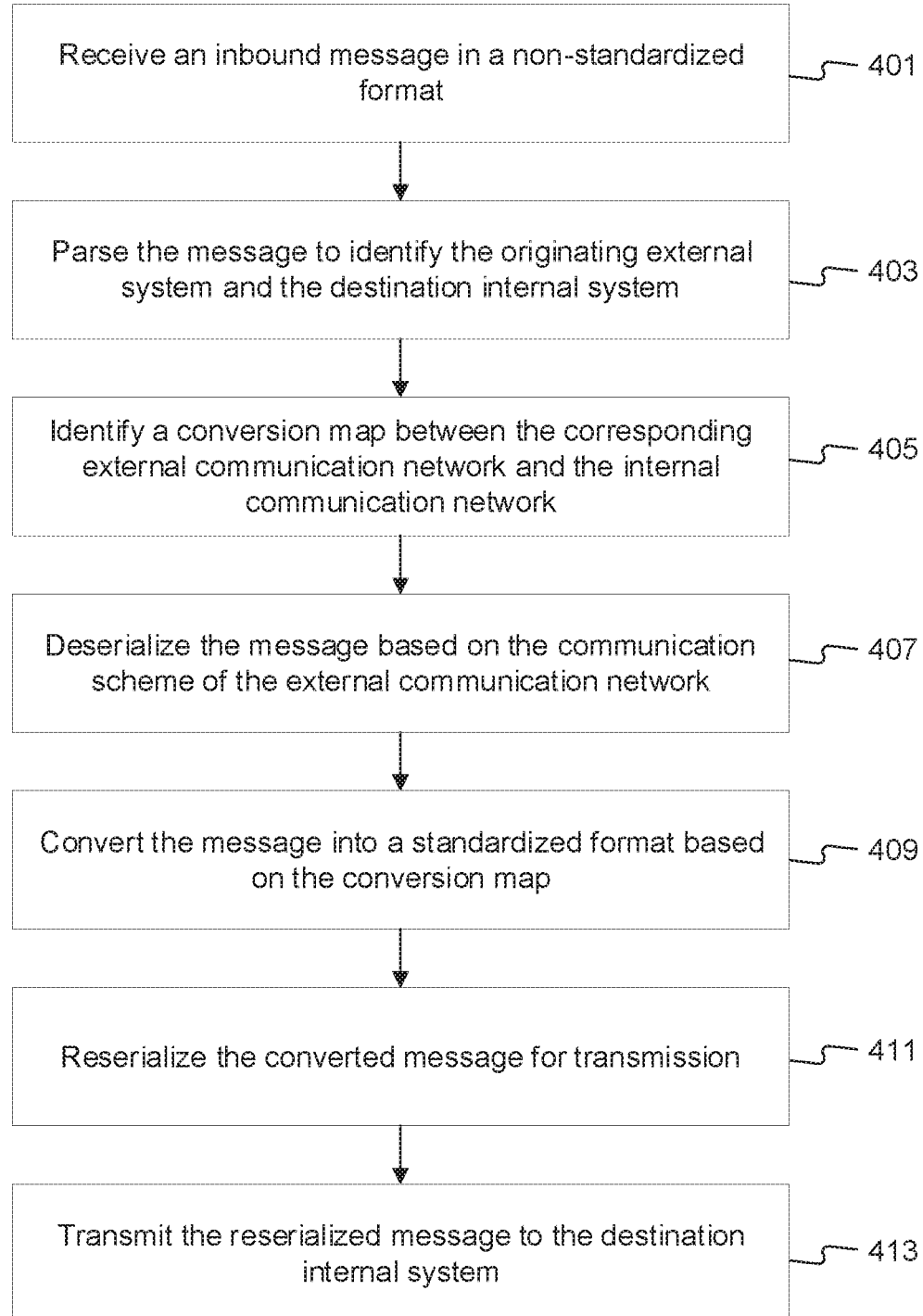
FIG. 4 is a flowchart of an exemplary computerized process for routing an inbound message after conversion to a standardized format, consistent with the disclosed embodiments.
Figure 5:
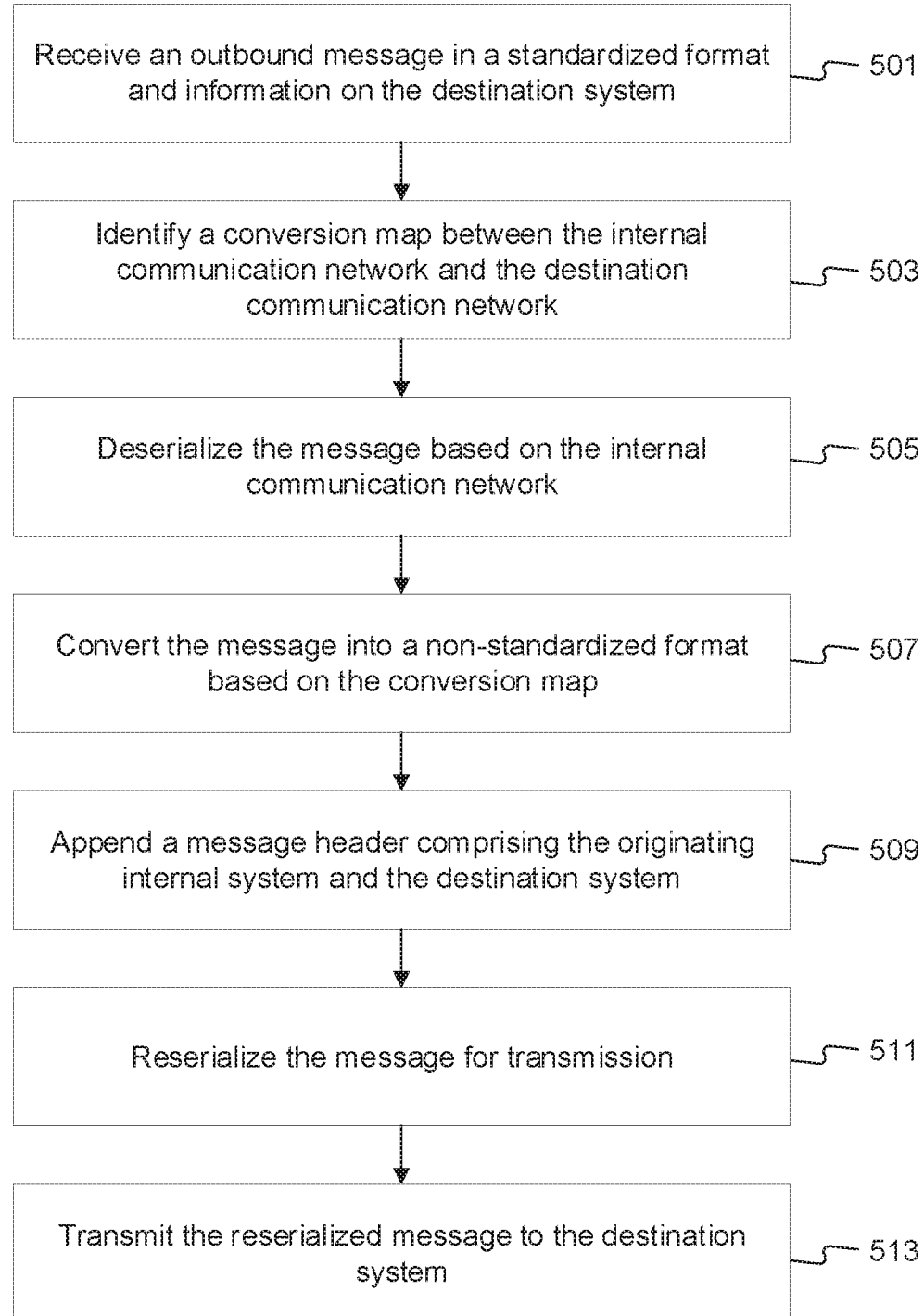
FIG. 5 is a flowchart of an exemplary computerized process for routing an outbound message after conversion to a non-standardized format, consistent with the disclosed embodiments.

FIG. 4 depicts a flowchart of an exemplary computerized inbound message routing process 400. Different steps of the inbound message routing process 400 may be performed by different layers (layers 303-311) of communication interface 301. Each of the steps is described below with reference to different elements of FIG. 3.

At step 401, inbound endpoint layer 303 may receive inbound messages from one or more external communication networks 333A-C. The inbound messages may be in a non-standardized format, suitable for use within the external communication network that it comes from according to its communication scheme but not necessarily readable by the internal communication network 323.

Once received, inbound endpoint layer 303 may, at step 403, parse the inbound message into its components to identify a message header and a message body. In some embodiments, the message header may contain information pertaining to the origin and the destination of the inbound message. For example, the message header may, in a first part, identify an originating external system (e.g., 3$^{rd}$ party fulfillment 335A) that it comes from and, in a second part, identify an destination internal system (e.g., SCM 325) within internal systems 321 as its destination.

In some embodiments, inbound endpoint layer 303 may be able to identify and parse the message header by recognizing the external communication network (e.g., 333A) based on a network address (e.g., IP address) of the originating external system in the message. For example, inbound endpoint layer 303 may match the network address to a list of known external communication networks (i.e., 333A-C) to identify the external communication network and the corresponding communication protocol. Inbound endpoint layer 303 may then use this information to parse the message header and identify the originating external system and the destination internal system as described above.

Communication Interface 301 may also comprise a memory or a database (not shown) configured to store information about external systems 331A-C, the corresponding external communication networks 333A-C, and their respective communication scheme. The information may further comprise preconfigured interface settings that specify how data contained in a non-standardized inbound message is to be converted into a standardized format based on the communication scheme of internal communication network 323 and a particular external communication network (e.g., 333A). For example, a preconfigured interface setting may include information on the API and the communication protocol used by the external communication network (e.g., 333A) where the inbound message came from. In some embodiments, combinations of a preconfigured interface setting, its corresponding communication protocol, and its associated external communication network (e.g., 333A-C) may be stored in a lookup table, a set of arrays, or the like.

In some embodiments, a preconfigured interface setting may include information on a framework or a file structure of an inbound message in a non-standardized format of a particular external communication network, data fields that the inbound message should contain, correspondence information on how the data fields of the inbound message corresponds to the data fields of the standardized format of the internal communication network 323, how the inbound message body should be deserialized based on the corresponding communication protocol, or the like. In some embodiments, the preconfigured interface setting may also include correspondence information on how the data fields of an outbound message in the standardized format corresponds to the data fields of the outbound message in the non-standardized format. Details of converting an outbound message to a non-standardized format will be explained below in more detail with respect to outbound converting layer 309.

At steps 405-411, inbound converting layer 305 may be configured to receive the origin and the destination information from inbound endpoint layer 303 and convert an inbound message from a non-standardized format to the standardized format for internal communication network 323.

Inbound converting layer 305 may perform the conversion using the preconfigured interface setting identified and retrieved from the memory or the database at step 405. At step 407, inbound converting layer 305 may deserialize the inbound message body based on the communication protocol corresponding to the external communication network, where the inbound message came from (e.g., 333A). Deserializing a message body may include, for example, parsing the message body into individual data objects, assigning attributes to the objects, identifying relationships between variables, or the like. This process of deserialization may identify different data fields, variables, respective values, and data structure of the variables contained in the deserialized message.

At step 409, inbound converting layer 305 may then individually and automatically assign the values of the identified data to corresponding data fields, variables, and data structure in the standardized format based on the preconfigured interface setting. In some embodiments, a subset of the data contained in the inbound message may not have a corresponding data field in the standardized format. In this case, the particular data may be discarded or appended to the standardized message as extra information. In some embodiments, inbound converting layer 305 may also generate an error message to be transmitted to both the originating external system and the destination internal system. Alternatively or additionally, inbound converting layer 305 may transmit the particular data to outbound converting layer 305 so that a subsequent response from internal systems 321 to the same external system that sent the inbound message may contain the particular data.

In some embodiments, the standardized format may include one or more data fields that have no correspondence in the non-standardized inbound message from a particular external communication network. In this case, inbound converting layer 305 may simply ignore or assign a predetermined default value to the data field. In some embodiments, inbound converting layer 305 may also generate an error message to be transmitted to both the originating external system and the destination internal system.

At step 411, inbound converting layer 305 may further be configured to reserialize the standardized message body according to the communication protocol of internal systems 321. Reserializing the standardized message body may include arranging data fields and their corresponding values in a sequence according to the syntax required by the communication protocol of internal communication network 323. This process of deserializing, converting, and reserializing an inbound message allows repackaging of the inbound message regardless of its chosen communication scheme at a central interface, so that internal systems 321 can transmit and receive the standardized inbound message without having to convert the message at individual systems or spending resources to ensure compatibility.

At step 413, routing layer 307 may be configured to receive the destination information and the standardized inbound message body and transmit the message through internal communication network 323 to the corresponding system (e.g., SCM 325, FO 327, or FC Auth 329) within internal systems 321. Transmitting the message may further include identifying the network address of the corresponding system within internal communication network 323.

For outbound communications originating from an internal system (e.g., SCM 325) for transmission to an external system (e.g., 335A), outbound endpoint layer 311 may be configured to receive the outbound message and perform similar functions described above with respect to inbound endpoint layer 303. For example, at step 501, outbound endpoint layer 311 may receive an outbound message comprising an outbound message body and a variable indicating the originating internal system (i.e., SCM 325) and the destination external system (i.e., 335A). In some cases, outbound endpoint layer 311 may need to parse the outbound message in order to identify the origin and the destination information in a process similar to that performed by inbound endpoint layer 303.

At step 503, outbound converting layer 309 may identify and retrieve a preconfigured interface setting that corresponds to the destination external system (i.e., 335A) from the memory or database described above. For example, outbound converting layer 309 may identify the external communication network (e.g., 333A) corresponding to the destination external system (i.e., 331A), the communication scheme of the identified external communication network (e.g., 333A), and retrieve the preconfigured interface setting for the identified communication scheme.

At steps 505, 507, and 511, outbound converting layer 309 may deserialize, convert, and reserialize the outbound message based on the identified communication scheme. In some embodiments, this process may be similar to that performed by inbound converting layer 305 but in reverse, where the values of the data fields of the outbound message are individually and automatically assigned to corresponding data fields of the non-standardized format.

In some embodiments, a subset of the data contained in the outbound message may not have a corresponding data field in the non-standardized format. In this case, the particular data may be discarded or appended to the non-standardized message as extra information. In some embodiments, outbound converting layer 309 may also generate an error message to be transmitted to both the originating internal system (i.e., SCM 325) and the destination external system (i.e., 335A). Alternatively, outbound converting layer 309 may transmit the particular data to inbound converting layer 305 so that a subsequent response from the particular external system (i.e., 335A) to the same internal system that sent the inbound message (i.e., SCM325) may contain the particular data. Still further, in some embodiments, the non-standardized format may include one or more data fields that have no correspondence in the outbound message. In this case, outbound converting layer 309 may simply ignore or assign a predetermined default value to the data field. outbound converting layer 309 may also generate an error message to be transmitted to both the originating internal system (i.e., SCM 325) and the destination external system (i.e., 335A).

At step 509, outbound converting layer 309 may append a message header to the outbound message, similar to the way the inbound message described above comprised a message header and a message body. The message header may contain information pertaining to an originating internal system (e.g., FO 327) and a destination external system (e.g., $3^{rd}$ party fulfillment 335C).

At step 513, routing layer 307 may transmit the non-standardized outbound message to the destination external system in a similar process described above with respect to transmitting the standardized inbound message to an internal system. In some embodiments, routing layer 307 may also transmit authentication data to a destination external communication network (e.g., 333B) for secure communication between internal systems 321 and the destination external systems (e.g., 331B).

Next, an exemplary application of communication interface 301 in the context of the systems described above with respect to FIG. 1A is described.

Referring back to FIG. 1A, system 100 may be an example of an entity comprising many different systems that communicate with each other via a network. System 100 may also need to communicate with third-party systems such as 3PL systems 121A-C via FMG 115. In some embodiments, FMG 115 may be an example of a communication interface 301 described above. This allows internal systems such as FO system 113, SCM system 117, and FC Auth 123 to communicate with external systems such as 3PL systems 121A-C, enabling coordination of order fulfillment via a network of internal and third-party warehouses without having to store all product inventory within a fulfillment center 200.

For example, system 100 may receive an order from a customer via internal front end system 105. The order may comprise one or more items (e.g., printer, chair, notepad, etc.) stocked within fulfillment center 200, a large item (e.g., refrigerator) stocked within a warehouse of a corresponding manufacturer, and a custom designed piece of jewelry designed and shipped directly from a designer.

Processing the order may then require communication among different systems of system 100. the systems of the manufacturer, and the systems of the designer, where the systems may communicate using different communication schemes. In this example, the manufacturer systems may need to receive the order from system 100 in order to prepare and ship the large item and transmit order status back to system 100. On the other hand, designer system may need to receive the order from system 100 along with details of the customization and transmit order status, expected time to completion, or the like back to system 100. Accordingly, messages between the manufacturer system and system 100 may require different parameters, message structures, or the like in addition to any difference between communication schemes of the three systems.

In some embodiments, the manufacturer system may also be configured to receive expected order volume from supply chain management system 117 of system 100 for upcoming holiday seasons, which would require a new set of parameters different from those received for processing an order above. Other systems such as 3PL systems 121A-C may also provide worker information of the corresponding third-party entity, enabling FMG 115 and thus system 100 to communicate with 3PL systems 121A-C as if it were a part of system 100.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for interfacing communication networks, the system comprising:
a memory storing instructions; and
at least one processor configured to execute the instructions for:
receiving a first message from a first communication network among a set of communication networks;
parsing the first message to obtain a first variable corresponding to the first communication network and a second variable corresponding to a first destination, the first communication network using a first communication protocol and the first destination using a second communication protocol;
converting the first message into a predetermined format for the second communication protocol based on the first variable and the second variable; and
transmitting the first message to the first destination;
wherein converting the first message into the predetermined format comprises: determining an interface map between the first communication protocol and the predetermined format of the second communication protocol; parsing the first message to identify a plurality of data variables; and assigning values of the plurality of data variables of the first message to corresponding data variables of the predetermined format based on the interface map.

2. The computer-implemented system of claim 1, wherein the first destination is within a second communication network, and wherein the instructions further comprise:
receiving a second message from an originating point within the second communication network, the second message comprising a third variable corresponding to a second destination;

identifying a third communication network among the set of communication networks based on the third variable, the third communication network using a third communication protocol;
converting the second message into a format corresponding to the third communication protocol; and
transmitting the converted second message to the second destination.

3. The computer-implemented system of claim 1, wherein the first destination is within a second communication network, and wherein the instructions further comprise:
receiving a third message from an originating point within the second communication network, the third message comprising a fourth variable corresponding to a third destination within the second communication network; and
transmitting the third message to the third destination.

4. The computer-implemented system of claim 1, wherein the first message is received using at least one of a Representational State Transfer (REST) API, a RESTful API, a file transfer API, a database-to-database API, a Simple Object Access Protocol (SOAP) API, or a Remote Procedure Call (RPC) API.

5. The computer-implemented system of claim 1, wherein the first communication protocol comprises at least one of JavaScript Object Notation (JSON), YAML Ain't Markup Language (YAML), Extensible Markup Language (XML), Tom's Obvious Minimal Language (TOML), CoffeeScript Object Notation (CSON), or MessagePack.

6. The computer-implemented system of claim 1, wherein converting the first message into the predetermined format comprises:
identifying the first communication protocol from one or more known communication protocols using a preconfigured data structure,
wherein the preconfigured data structure matches one or more known communication networks with the one or more known communication protocols.

7. The computer-implemented system of claim 1, wherein individual communication networks of the set of communication networks are non-overlapping among themselves and with a second communication network associated with the first destination.

8. The computer-implemented system of claim 1, wherein the first message comprises one or more data variables with no corresponding data variable in the predetermined format, or the predetermined format comprises data variables with no corresponding data variable in the first message.

9. A computer-implemented method for interfacing communication networks, the method comprising:
receiving a first message from a first communication network among a set of communication networks;
parsing the first message to obtain a first variable corresponding to the first communication network and a second variable corresponding to a first destination, the first communication network using a first communication protocol and the first destination using a second communication protocol;
converting the first message into a predetermined format for the second communication protocol based on the first variable and the second variable; and
transmitting the first message to the first destination;
wherein converting the first message into the predetermined format comprises: determining an interface map between the first communication protocol and the predetermined format of the second communication protocol; parsing the first message to identify a plurality of data variables; and assigning values of the plurality of data variables of the first message to corresponding data variables of the predetermined format based on the interface map.

10. The computer-implemented method of claim 9, wherein the first destination is within a second communication network, and wherein the method further comprises:
receiving a second message from an originating system within the second communication network, the second message comprising a third variable corresponding to a second destination;
identifying a third communication network among the set of communication networks based on the third variable, the third communication network using a third communication protocol;
converting the second message into a format corresponding to the third communication protocol; and
transmitting the converted second message to the second destination.

11. The computer-implemented method of claim 9, wherein the first destination is within a second communication network, and wherein the method further comprises:
receiving a third message from an originating system within the second communication network, the third message comprising a fourth variable corresponding to a third destination within the second communication network; and
transmitting the third message to the third destination.

12. The computer-implemented method of claim 9, wherein the first message is received using at least one of a Representational State Transfer (REST) API, a RESTful API, a file transfer API, a database-to-database API, a Simple Object Access Protocol (SOAP) API, or a Remote Procedure Call (RPC) API.

13. The computer-implemented method of claim 9, wherein the first communication protocol comprises at least one of JavaScript Object Notation (JSON), YAML Ain't Markup Language (YAML), Extensible Markup Language (XML), Tom's Obvious Minimal Language (TOML), CoffeeScript Object Notation (CSON), or MessagePack.

14. The computer-implemented method of claim 9, wherein converting the first message into the predetermined format comprises:
identifying the first communication protocol from one or more known communication protocols using a preconfigured data structure,
wherein the preconfigured data structure matches one or more known communication networks with the one or more known communication protocols.

15. The computer-implemented method of claim 9, wherein individual communication networks of the set of communication networks are non-overlapping among themselves and with a second communication network associated with the first destination.

16. The computer-implemented system of claim 9, wherein the first message comprises one or more data variables with no corresponding data variable in the predetermined format, or the predetermined format comprises data variables with no corresponding data variable in the first message.

17. A computer-implemented system for interfacing communication networks, the system comprising:
an inbound endpoint layer configured to receive an inbound message from a first communication network among a set of communication networks, the inbound endpoint layer further comprising an inbound parser configured to parse the inbound message to determine a first variable corresponding to the first communication network and a second variable corresponding to a first destination within a second communication network, the first communication network using a first communication protocol and the first destination using a second communication protocol;
an inbound converting layer configured to convert the inbound message into a predetermined format based on the first variable and the second variable;
a routing layer configured to transmit the converted inbound message to the first destination;
an outbound endpoint layer configured to receive an outbound message from an originating point within the second communication network, the outbound message comprising a third variable corresponding to a second destination; and
an outbound converting layer configured to convert the outbound message into a target format based on the third variable, wherein the routing layer is further configured to transmit the converted outbound message to the second destination;
wherein the outbound converting layer is further configured to convert the outbound message by: identifying a third communication network corresponding to the second destination; and appending an outbound message header to the outbound message to create a converted outbound message, the outbound message header comprising a first data field corresponding to the second destination.

18. A computer-implemented system of claim 17, wherein the second destination is associated with a third communication network.

* * * * *